United States Patent [19]

Töpfl

[11] 4,323,490
[45] Apr. 6, 1982

[54] MIXTURES OF COMPONENTS, COMPRISING EPOXIDE/POLYALKYLENE-POLYAMINOAMIDE REACTION PRODUCTS AND ACRYLIC-BASED AND/OR STYRENE-BASED POLYMERS, THEIR PREPARATION AND THEIR USE AS PAPER SIZES AND TEXTILE TREATMENT AGENTS

[75] Inventor: Rosemarie Töpfl, Dornach, Switzerland

[73] Assignee: Ciba-Geigy Corporation, Ardsley, N.Y.

[21] Appl. No.: 246,338

[22] Filed: Mar. 23, 1981

[30] Foreign Application Priority Data

Mar. 28, 1980 [CH] Switzerland ................... 2490/80

[51] Int. Cl.³ ............................................. C08L 63/10
[52] U.S. Cl. ................... 523/409; 162/168 N; 427/393.4; 523/411; 523/423
[58] Field of Search .......... 260/23 EP, 23 CP, 23 ST, 260/23.5 R, 29.6 NR

[56] References Cited

U.S. PATENT DOCUMENTS 3,816,366  6/1974  Laudise ...................... 260/23 EP Primary Examiner—Paul R. Michl
Attorney, Agent, or Firm—John P. Spitals

[57] ABSTRACT

New mixtures of components comprising (A) reaction products of (a) 1.0 epoxy group equivalent of a diglycidyl ether, (b) 0.2 to 5.0 amino group equivalents of a polyalkylenepolyaminoamide obtained from (b') a polymerised, unsaturated fatty acid and (b") an aliphatic polyalkylenepolyamine, (c) 0 to 0.6 amino group equivalent of a primary fatty amine and (d) 0 to 1.0 mol of an epihalogenohydrin, these reaction products being converted into the salt form by adding acid, and (B) a homopolymer of styrene or a copolymer of styrene or acrylonitrile and an alkyl acrylate or methacrylate, which mixtures of components can be used as paper sizes and as textile treatment agents.

42 Claims, No Drawings

MIXTURES OF COMPONENTS, COMPRISING EPOXIDE/POLYALKYLENE-POLYAMINOAMIDE REACTION PRODUCTS AND ACRYLIC-BASED AND/OR STYRENE-BASED POLYMERS, THEIR PREPARATION AND THEIR USE AS PAPER SIZES AND TEXTILE TREATMENT AGENTS

The invention relates to novel mixtures of components which contain, as component (A), at least one water-dispersible or water-soluble salt of a reaction product, this salt being prepared by reacting (a) 1.0 epoxy group equivalent of a diglycidyl ether of 2,2-bis-(4'-hydroxyphenyl)-propane, (b) 0.2 to 5.0 amino group equivalents of a polyalkylenepolyaminoamide of (b') a polymerised, unsaturated fatty acid which is derived from fatty acids having 12 to 24 carbon atoms and (b") an aliphatic polyalkylenepolyamine having 4 to 12 carbon atoms, (c) 0 to 0.6 amino group equivalent of at least one primary fatty amine having 12 to 24 carbon atoms, 1.0 to 5.0 amino group equivalents of component (b) being employed if component (c) is absent, and 0.5 to 2.0 amino group equivalents of component (b) being employed if component (c) is used, and (d) 0 to 1.0 mol of an epihalogenohydrin, in the presence of an inert, organic solvent at temperatures up to 110° C., it being ensured, by adding an acid, at the latest when the reactions have ended, that a sample of the reaction mixture diluted with water to 10 to 40 percent by weight has a pH value of 2 to 8, a salt being formed, and, as component (B), a homopolymer of styrene or a copolymer of styrene or acrylonitrile and an alkyl acrylate or methacrylate having 4 to 12 carbon atoms in the alkyl radical.

The invention also relates to the preparation process for the mixtures of components of the said reaction product salts (A) of components (a), (b) and, if desired, (c) and (d) and of the homopolymers or copolymers (B), the use of the mixtures of components as paper sizes and textile treatment agents, a process for the treatment of textile materials and for surface-sizing paper using the mixtures of components, and the paper sized by these processes or the textile materials treated by these processes.

The mixtures of components according to the invention preferably contain reaction product salts (A) which are obtained from, as component (a), diglycidyl ethers of 2,2-bis-(4'-hydroxyphenyl)-propane, also called bisphenol A, which preferably have an epoxide content of 1.8 to 5.8, in particular 5 to 5.5, epoxy group equivalents/kg. Particularly preferred epoxides of this type are those of the formula

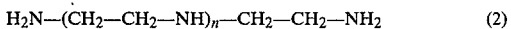
(1)

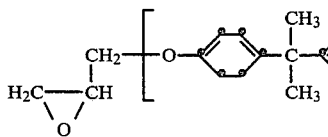

in which z is an average number with a value from 0 to 0.65. 0 is of especial interest as a value of z. Such epoxides are obtained, for example, by reacting 2,2-bis-(4'-hydroxyphenyl)-propane with epichlorohydrin or bis-halogenohydrin compounds and then treating the product with a base.

The polymerised unsaturated fatty acids used as component (b') for the formation of the polyalkylenepolyaminoamide (b) are preferably dimerised to trimerised fatty acids which are derived from monocarboxylic acids having 12 to 24, preferably 16 to 22 and in particular 16 to 18, carbon atoms. These monocarboxylic acids are fatty acids with at least one, preferably 2 to 5, ethylenically unsaturated bonds. Representatives of this class of acids are, for example, lauroleic acid, myristoleic acid, palmitoleic acid, physetoleic acid, oleic acid, elaidic acid, petroselinic acid, eicosenoic acid, cetoleic acid, gadoleic acid and erucic acid and, preferably, eleostearic acid, parinaric acid, arachidonic acid, clupanodonic acid and nisinic acid, and in particular linoleic acid and linolenic acid. These fatty acids can be obtained from natural oils of vegetable or animal origin, in which they occur, in particular, as glycerides.

The dimerised to trimerised fatty acids (b') used according to the invention are obtained in a known manner by dimerisation of monocarboxylic acids of the type mentioned. The so-called dimerised fatty acids are industrial mixtures which always have a content of trimerised acids and a small content of monomeric acids.

Particularly suitable components (b') are dimerised to trimerised linoleic acid and linolenic acid. The industrial mixtures of these acids as a rule contain 75 to 95 percent by weight of dimerised acid, 4 to 25 percent by weight of trimerised acid and a trace to 3 percent by weight of monomeric acid. The molar ratio of dimerised to trimerised acid is accordingly about 5:1 to 36:1.

Suitable components (b"), are, in particular, polyalkylenepolyamines of the formula $$H_2N-(CH_2-CH_2-NH)_n-CH_2-CH_2-NH_2 \quad (2)$$

in which n is 1 to 5, preferably 1, 2 or 3, that is to say diethylenetriamine, triethylenetetramine or tetraethylenepentamine, triethylenetetramine being particularly important.

In the case of amine mixtures, it is also possible to assume that n has a non-integral average value, for example between 1 and 2. Industrial amine mixtures of the type mentioned are also preferred.

Particularly interesting components (b) are polyalkylenepolyaminoamides of dimerised to trimerised linoleic or linolenic acid and triethylenetetramine.

Very suitable optional components (c) are, in particular, saturated or unsaturated primary fatty amines having 12 to 24, preferably 16 to 22 and in particular 16 to 18, carbon atoms.

The amines are thus, for example, laurylamine, myristylamine, arachidylamine or behenylamine and, in particular, palmitylamine, stearylamine or oleylamine. The amines are also, in particular, mixtures of such amines such as are obtainable as industrial products.

Polyalkylenepolyaminoamides, as component (b), and mono-fatty amines, as optional component (c) which each contain 3 to 4 amino group equivalents per kg, are of especial interest.

The halogenohydrin for the optional component (d) is, in particular, epibromohydrin or, especially, epichlorohydrin.

The reaction products (A) contained in the mixtures of components according to the invention are preferably prepared from components (a) and (b), or (a), (b), (d) and, if desired, (c). In the case of the reaction product salts (A) prepared in the absence of the optional component (c), 1.5 to 5.0 amino group equivalents of component (b) are preferably employed per epoxy group equivalent of component (a). In contrast, if the optional component (c) is also used in the preparation of the reaction product salts (A), 0.5 to 2.0 amino group equivalents of component (b) and 0.2 to 0.5 amino group equivalent of component (c) are preferably employed per epoxy group equivalent of component (a). If the optional component (d) is also additionally used in the preparation of the reaction product salts (A) from components (a) and (b) or (a), (b) and (c), 0.1 to 0.5 mol of component (d) is employed per epoxy group equivalent of component (a).

The sequence in which components (a), (b) and, where relevant, (c) and (d) are reacted with one another to form the reaction product salts (A) is of minor importance. However, as a rule, component (b) is initially introduced into the reaction vessel and is then reacted with component (a), if neither of the optional components (c) and (d) is also used. In contrast, if the optional component (c) is also used, this component is preferably initially introduced into the reaction vessel and is reacted first with component (a) and then with component (b). However, it is also possible to subject components (a) and (c) to a precondensation reaction to give an epoxide/fatty amine reaction product, which is further reacted with component (b). If the optional component (d) is also used, it is preferably added last, i.e. after the reaction of components (a), (b) and, where relevant, (c), in the order given.

The additional acid which is always required for adjusting the pH value to 2 to 8 can be either an inorganic acid or an organic acid having at most 4 carbon atoms.

The inorganic acids are, in particular, hydrochloric or nitric acid, and preferably phosphoric acids, in particular orthophosphoric acid, and, furthermore, sulfamic acid. The organic acids are saturated di- or, preferably, mono-carboxylic acids having at most 4 carbon atoms, such as oxalic acid, malonic acid and succinic acid, and preferably formic acid, acetic acid and propionic acid. Mixtures of the acids mentioned can likewise be used. Volatile, saturated monocarboxylic acids, such as formic acid, and especially acetic acid, are of particular importance.

Orthophosphoric acid, sulfamic acid and oxalic acid, if desired in the presence of formic acid or acetic acid, i.e. sulfamic acid by itself on the one hand, or phosphoric acid with subsequent addition of formic acid or acetic acid on the other hand, are also preferred. The use of formic acid and, in particular, acetic acid by themselves is of especial interest, reaction product salts which have a preferred pH value from 4 to 6 when diluted with water being obtained. Homogeneous emulsions of the reaction product salts (A) which have a salt content, calculated as solids, of 15 to 35 percent by weight are as a rule obtained. The acid is advantageously already added during the reaction of components (a), (b) and, where relevant, (c) and (d), or is added only after the reactions have ended.

The organic solvent in the presence of which the reactions of components (a), (b) and, where relevant, (c) and (d) are carried out is inert, i.e. it is unable to react with any of the components mentioned.

The organic solvents are, in particular, water-soluble organic solvents, and, especially advantageously, those which are miscible with water in any proportions. Examples are cycloaliphatic and aliphatic ethers having 3, or preferably, 2, oxygen atoms and 2 to 8, preferably 4 to 8, carbon atoms, such as dioxane, ethylene glycol mono-n-butyl ether (=n-butylglycol) and diethylene glycol mono-n-butyl ether, and in particular alkanols having 1 to 4 carbon atoms, for example isopropanol, ethanol and methanol.

In addition, however, it is also possible to carry out the reactions in the presence of water-insoluble organic solvents, for example in benzine hydrocarbons, such as benzine, petroleum ether, benzene or benzenes which are halogenated or substituted by lower alkyl groups, such as toluene, xylene or chlorobenzene; alicyclic compounds, such as tetralin or cyclohexane; and halogenated hydrocarbons having preferably 1 or 2 carbon atoms, such as methylene chloride, methylene bromide, chloroform, carbon tetrachloride, ethylene chloride, ethylene briomide, s-tetrachloroethane and, in particular, trichloroethylene or perchloroethylene.

As a rule, all the reactions are carried out in the same solvent, isopropanol being of especial interest.

The preferred temperature range in which the reactions in the solvents mentioned are carried out is 20° to 110° C., preferably 40 to 95 and in particular 60° to 95° C.

The mixtures of components according to the invention contain, as component (B), a homopolymer or copolymer of the type mentioned, which is prepared in the presence of water, the reaction product salts, as component (A), and a polymerisation catalyst at temperatures up to 95° C., preferably at 60° to 95° C.

The catalysts customarily used in polymerisation reactions, such as azo compounds, for example azoisobutyronitrile, and, in particular, peroxides, for example dilauroyl peroxide, dibenzoyl peroxide and, preferably, tert.-butyl hydroperoxide, and in particular hydrogen superoxide, are used in the preparation of the polymers as components (B) of the mixtures of components according to the invention.

If components (B) are copolymers of styrene or acrylonitrile and an alkyl methacrylate or, preferably, alkyl acrylate, the alkyl esters have straight-chain or, in particular, branched alkyl radicals having 4 to 12, preferably 4 to 8, carbon atoms, such as 2,2-dimethylpropyl radicals, and preferably isobutyl radicals and in particular 2-ethylhexyl radicals. Such copolymers have a preferred weight ratio of styrene or acrylonitrile:alkyl ester of the type mentioned of 1:0.1 to 1:2.0, in particular 1:1.2 to 1:1.8 in the case of copolymers of acrylonitrile and alkyl esters and 1:0.2 to 1:1 in the case of copolymers of styrene and alkyl esters, the latter copolymers being of especial interest.

Particularly preferred mixtures of components contain 25 to 80 percent by weight of the reaction product salts, as component (A), and 20 to 75 percent by weight of the homopolymers or copolymers of the type mentioned, as component (B), the sum of these amounts of components (A) and (B) in the mixture of components always being 100 percent by weight. The mixtures of components are as a rule in the form of homogeneous, fine, mobile emulsions, the solids content of which is preferably 10 to 40 percent by weight. Such emulsions are distinguished by their outstanding shelf life and are used as paper sizes for surface-sizing and as textile treatment agents.

Before being used as paper sizes, these emulsions are first diluted with water so that aqueous sizing liquors having a solids content of 0.02 to 1, preferably 0.02 to 0.2, percent by weight are formed. In surface-sizing, the paper is in general impregnated with the dilute sizing liquor at room temperature, for example by spraying or, in particular, by padding, and is then dried at 60° to 140° C., preferably 90° to 110° C., for 0.1 to 10, preferably 1 to 6, minutes. After drying, coating weights of the mixtures of components of 50 to 150 mg/m$^2$, preferably of 60 to 120 mg/m$^2$, calculated as solids, are obtained.

Very good sizing effects, which are confirmed by positive test results, such as Cobb water absorption and the alkaline ink flotation time, can be achieved on paper even with small amounts of the mixtures of components according to the invention. In particular, in surface-sizing, the small amounts applied to the surface permit a rapid procedure, so that good sizing is already achieved within about 20 to 40 seconds at a drying temperature of, for example, 90° to 110° C. Moreover, the compatibility of the reaction product salts used according to the invention with the customary assistants used in the paper industry, such as dyes, pigments, binders, for example starch, and, in particular, cationic fluorescent brighteners and other additives, is good. Furthermore, the reaction product salts do not tend to foam in an undesired manner.

In the treatment of textile materials, an aqueous liquor which preferably contains 1 to 5 percent by weight of the mixture of components, which is present as a 10 to 40 percent by weight emulsion, is applied to the materials, for example by spraying, immersion or, preferably, padding, after which the materials are dried at temperatures of, preferably, below 100° C., for example at 70° to 90° C., for about 10 to 30 minutes and are then subjected to heat treatment at temperatures above 100° C., for example at 130° to 190° C., for about 30 seconds to 10 minutes, in particular 1 to 5 minutes, preferably by the so-called thermofixing method.

Appropriate textile materials contain synthetic fibres of, for example, viscose, viscose staple, filament viscose rayon, cellulose acetate (2½-acetate and triacetate), acetates or ketals of polyvinyl alcohol, acrylonitrile copolymers (preferably with an acrylonitrile content of at least 50 and in particular 85 percent by weight of the copolymer, for the preparation of which other vinyl compounds, for example vinyl chloride, vinylidene chloride, methyl acrylates, acrylamide or styrenesulfonic acid have been used as comonomers), polyacrylonitrile or polyesters. Mixtures of these synthetic fibres with one another can also be used. In addition to the synthetic fibres, the textile materials can also contain smaller proportions, as a rule at most 30 to 40 percent by weight, of fibres of natural origin of, for example, wool or, preferably, cellulose and in particular cotton. However, textile materials which consist only of synthetic fibres are preferred.

The textile materials are preferably in the form of woven fabrics or knitted fabrics, which may have been subjected to fluorescent brightening and/or may have been dyed. Polyester woven fabrics, polyacrylonitrile knitted fabrics and polyester/viscose mixed fabrics are of especial interest.

The fabrics treated according to the invention are distinguished by good anti-pilling, anti-snagging and soil-repellency effects; the anti-pilling and anti-snagging effects are retained after several normal washes in the home, i.e. they are permanent, and the soil-repellency effects apply, in particular, to dry soiling and do not substantially affect the wet soiling.

In the examples and preparation instructions which follow, parts and percentages are always by weight.

PREPARATION PROCESS FOR COMPONENT (A)

A. 56 parts of tallow fat amine (0.2 amino group equivalent of an industrial mixture of 50% of palmitylamine, 30% of stearylamine and 40% of oleylamine, which has an amine content of 3.57 equivalents/kg) are dissolved in 15 parts of isopropanol at 80° C. A solution of 75.6 parts of an epoxide formed from 2,2-bis-(4'-hydroxyphenyl)-propane and epichlorohydrin (0.4 epoxy group equivalent of the epoxide, which has an epoxide content of 5.29 equivalents/kg) in 15 parts of isopropanol is added to the fatty amine solution, whereupon an exothermic reaction starts. The reaction mixture is kept at 85° C. for 15 minutes and then treated with a solution of 43 parts of a polyethylenepolyaminoamide formed from dimerised linoleic acid and triethylenetetramine (0.2 amino group equivalent of the polyaminoamide, which has an amine content of 4.65 equivalents/kg) in 15 parts of isopropanol. After addition of the polyethylenepolyaminoamide, the reaction mixture is again heated to 85° C. and is kept at this temperature for 2 hours, 28.5 parts of glacial acetic acid are then added and the mixture is diluted with 334 parts of water. 582.1 parts of a solution of the reaction product salt with a solids content of 30% and a pH value of 4.3 are obtained.

B. 67.3 parts of a polyethylenepolyaminoamide formed from dimerised linoleic acid and triethylenetetramine (0.3 amino group equivalent of the polyaminoamide, which has an amine content of 4.46 equivalents/kg) are dissolved in 22.4 parts of isopropanol. 18 parts of glacial acetic acid are added to the solution. After the addition of glacial acetic acid, a solution, diluted with water in the ratio 1:5, of this polyaminoamide solution has a pH value of 5.5. The solution is then heated to 70° C. and treated with a solution of 28 parts of the epoxide given in instruction A (0.15 epoxy group equivalent) in 9.5 parts of isopropanol, whereupon an exothermic reaction starts. After addition of the epoxide, the reaction mixture is kept at 70° C. for 1 hour and then diluted with 331 parts of water. 476.2 parts of a solution of the reaction product salt with a solids content of 20% are obtained.

C. The procedure given in instruction B. is repeated, except that, after the addition of glacial acetic acid, the polyaminoamide solution is treated, at 70° C., with a solution of 14 parts of the epoxide given in instruction A. (0.075 epoxy group equivalent) in 5 parts of isopropanol and, after addition of the epoxide, the reaction mixture is kept at 75° C. for ½ hour and is then diluted with 280 parts of water. 406.7 parts of a solution of the reaction product salt with a solids content of 20% are obtained.

D. 37.8 parts of the epoxide given in instruction A. (0.2 epoxy group equivalent) and 13 parts of tallow fat amine (0.05 amino group equivalent of an industrial mixture of 30% of palmitylamine, 30% of stearylamine and 40% of oleylamine, which has an amine content of 3.84 equivalents/kg) are dissolved in 17 parts of isopropanol and the solution is heated to 85° C. and kept at this temperature for 1 hour. The reaction mixture is then treated with a solution of 90 parts of a polyethylenepolyaminoamide formed from dimerised linoleic acid and triethylenetetramine (0.4 amino group equivalent of the polyaminoamide, which has an amine content of 4.44 equivalents/kg) in 30 parts of isopropanol, and with 27 parts of glacial acetic acid. After the addition of glacial acetic acid, a sample of this polyaminoamide solution diluted with water in the ratio 1:5 has a pH value of 5.5.

After the addition of the polyaminoamide and glacial acetic acid, the reaction mixture is heated again, to 95° C., and is kept at this temperature for 1 hour and then diluted with 254 parts of water. 468.8 parts of a solution of the reaction product salt with a solids content of 30% are obtained.

E. 39.84 parts of a mixture of 27% of 1-amino-docosane, 27% of 1-aminoeicosane, 36% of stearylamine and 10% of palmitylamine (0.12 amino group equivalent of the chemical mixture, which has an amine content of 3.01 equivalents/kg) are dissolved in 17 parts of ethylene glycol mono-n-butyl ether at 85° C. A solution of 45.6 parts of an epoxide formed from 2,2-bis-(4'-hydroxyphenyl)-propane and epichlorohydrin (0.24 epoxy group equivalent of the epoxide, which has an epoxide content of 5.26 equivalents/kg) in 15.2 parts of ethylene glycol mono-n-butyl ether is added to the fatty amine solution, whereupon an exothermic reaction starts. The reaction mixture is kept at 90° C. for 1 hour and is then treated with a solution of 27.6 parts of a polyethylenepolyaminoamide formed from dimerised linoeleic acid and triethylenetetramine (0.12 amino group equivalent of the polyaminoamide, which has an amine content of 4.34 equivalents/kg) in 9.2 parts of ethylene glycol mono-n-butyl ether. After this addition, the reaction mixture is kept at 90° C. for 2 hours, and a solution which contains 12 parts of 35% hydrochloric acid in 210 parts of water is added. 376.8 parts of a solution of the reaction product salt which has a solids content of 30% and a pH value of 3.8 are obtained.

EXAMPLE 1

120 parts of the 30% solution of the reaction product salt obtained in instruction A are diluted with 81.3 parts of water and mixed with 27 parts of styrene and 9 parts of isobutyl acrylate, whereupon a homogeneous emulsion is formed. Under an inert nitrogen atmosphere, this emulsion is now treated with 2.7 parts of aqueous 35% strength hydrogen superoxide solution and the mixture is heated to 80° C. and kept at this temperature for 6 hours. 240 parts of a mobile, fine emulsion with a solids content of 30% are obtained.

EXAMPLE 2

168 parts of the 30% solution of the reaction product salt obtained in instruction A are diluted with 48.1 parts of water and mixed with 16 parts of styrene and 5.3 parts of 2-ethylhexyl acrylate, whereupon a homogeneous emulsion is formed. Under an inert nitrogen atmosphere this emulsion is now treated with 1.6 parts of aqueous 35% hydrogen superoxide solution and the mixture is heated to 80° C. and kept at this temperature for 6 hours. 240 parts of a mobile, fine emulsion with a solids content of 30% are obtained.

EXAMPLE 3

120 parts of the 30% solution of the reaction product salt obtained in instruction A are diluted with 81.3 parts of water and mixed with 27 parts of styrene and 9 parts of 2-ethylhexyl acrylate, whereupon a homogeneous emulsion is formed. Under an inert nitrogen atmosphere this emulsion is now treated with 2.7 parts of aqueous 35% hydrogen superoxide solution and the mixture is heated to $\frac{2}{3}$ 80° C. and kept at this temperature for 6 hours. 240 parts of a mobile, fine emulsion with a solids content of 30% are obtained.

EXAMPLE 4

116.5 parts of the 30% solution of the reaction product salt obtained in instruction A are diluted with 160 parts of water and mixed with 52.5 parts of styrene and 17.5 parts of 2-ethylhexyl acrylate, whereupon a homogeneous emulsion is formed. Under an inert nitrogen atmosphere this emulsion is now treated with 3.5 parts of aqueous 35% hydrogen superoxide solution and the mixture is heated to 80° C. and kept at this temperature for 8 hours. 350 parts of a mobile, fine emulsion with a solids content of 30% are obtained.

EXAMPLE 5

116.5 parts of the 20% solution of the reaction product salt obtained in instruction B are diluted with 184.5 parts of water and mixed with 35 parts of styrene and 11.7 parts of 2-ethylhexyl acrylate, whereupon a homogeneous emulsion is formed. Under an inert nitrogen atmosphere this emulsion is now treated with 2.3 parts of aqueous 35% hydrogen superoxide solution and the mixture is heated to 80° C. and kept at this temperature for 8 hours. 350 parts of a mobile, fine emulsion with a solids content of 20% are obtained.

EXAMPLE 6

116.5 parts of the 20% solution of the reaction product salt obtained in instruction C are diluted with 184.5 parts of water and mixed with 35 parts of styrene and 11.7 parts of 2-ethylhexyl acrylate, whereupon a homogeneous emulsion is formed. Under an inert nitrogen atmosphere this emulsion is now treated with 2.3 parts of aqueous 35% hydrogen superoxide solution and the mixture is heated to 80° C. and kept at this temperature for 8 hours. 350 parts of a mobile, fine emulsion with a solids content of 20% are obtained.

EXAMPLE 7

83.3 parts of the 30% solution of the reaction product salt obtained in instruction D are diluted with 112 parts of water and mixed with 37.5 parts of styrene and 12.5 parts of 2-ethylhexyl acrylate, whereupon a homogeneous emulsion is formed. Under an inert nitrogen atmosphere this emulsion is now treated with 4.7 parts of aqueous 80% tert.-butyl hydroperoxide solution and the mixture is heated to 80° C. and kept at this temperature for 6 hours. 250 parts of a mobile, fine emulsion with a solids content of 30% are obtained.

EXAMPLE 8

86.6 parts of the 30% solution of the reaction product salt obtained in instruction A are diluted with 117.4 parts of water and mixed with 21 parts of acrylonitrile and 31 parts of 2-ethylhexyl acrylate, whereupon a homogeneous emulsion is formed. Under an inert nitrogen atmosphere this emulsion is now treated with 4 parts of aqueous 35% hydrogen superoxide solution and the mixture is heated to 80° C. and kept at this temperature for 6 hours. 260 parts of a mobile, fine emulsion with a solids content of 30% are obtained.

EXAMPLE 9

65 parts of the 30% solution of the reaction product salt obtained in instruction A are diluted with 133.6 parts of water and mixed with 58.5 parts of styrene, whereupon a homogeneous emulsion is formed. Under an inert nitrogen atmosphere this emulsion is now treated with 2.9 parts of aqueous 35% hydrogen superoxide solution and the mixture is heated to 80° C. and kept at this temperature for 6 hours. 260 parts of a mobile, fine emulsion with a solids content of 30% are obtained.

EXAMPLE 10

133.3 parts of the 30% solution of the reaction product salt obtained in instruction E are diluted with 23 parts of water and mixed with 6.45 parts of n-butyl acrylate and 3.55 parts of acrylonitrile, whereupon a homogeneous emulsion is formed. Under an inert nitrogen atmosphere this emulsion is now treated with 0.75 part of aqueous 35% hydrogen superoxide solution and the mixture is heated to 80° C. and kept at this temperature for 6 hours. 167 parts of a mobile, fine emulsion with a solids content of 30% are obtained.

EXAMPLE 11

A pure cellulose filter paper with a weight per unit area of 110 g/m$^2$ is padded, at a speed of 4 m/minute and under a pressure of 10 kg/cm$^2$, with an aqueous liquor which contains the amounts of emulsions from one of Examples 1 to 7 which are given in Table 1 which follows. The padded paper is dried at 90° C. for 10 minutes. The surface sizing achieved on the treated paper is subjected to the Cobb water absorption test for 30 seconds (Cobb$_{30}$WA) as described in DIN No. 53,132. The lower the water absorption in the Cobb$_{30}$WA test is, the better is the surface sizing of the treated paper. The results of the Cobb$_{30}$WA test are also given in Table 1 which follows.

TABLE 1

| Emulsion of Example | Strength* of the emulsion | Strength* of the padding liquor** | Coating weight* mg/m$^2$ | Result of Cobb$_{30}$WA test g/m$^2$ |
| --- | --- | --- | --- | --- |
| 1 | 30 | 0.1 | 100 | 19 |
| 2 | 30 | 0.1 | 100 | 17 |
| 3 | 30 | 0.1 | 100 | 15 |
| 4 | 30 | 0.1 | 100 | 20 |
| 5 | 20 | 0.1 | 100 | 18 |
| 6 | 20 | 0.1 | 100 | 18 |
| 7 | 30 | 0.1 | 100 | 30 |
| untreated paper | | | | 188 |

*calculated as solids
**obtained by diluting the 20 or 30% emulsions of one of Examples 1 to 9 with the appropriate amount of water.

Similar results are obtained when the filter paper is padded with liquors which contain an emulsion from Example 8, 9 or 10.

EXAMPLE 12

A polyester/viscose (PES/CV) 67/33 mixed woven fabric and a polyacrylonitrile (PAC) woven fabric are each padded with an aqueous liquor containing 2% of the 30% emulsion obtained in Example 8 and are dried at 80° C. for 30 minutes and subjected to heat treatment at 140° C. for 1 minute by the thermofixing method. A portion of the woven fabric and a portion of the knitted fabric are then each washed 5 times in an aqueous liquor containing 4 g/l of a commercially available domestic washing agent (SNV 198 861) at 60° C. in a domestic washing machine for 45 minutes. The individual woven fabrics and knitted fabrics treated according to the invention are tested, before and after these 5 washing operations, by the following method, in comparison with untreated woven fabrics and knitted fabrics, for their anti-pilling effects: the textile test pieces (10×13 cm) are sown around rubber tubes which are 4 cm long and have a wall thickness of 5 mm and an external diameter of 3½ cm. Two of the samples thus prepared, together with two rubber rollers, are placed in each of the plastic-lined chambers (12×12×12 cm) of the pilling test apparatus No. 59 from Zweigle KG, Reutlingen, Federal Republic of Germany. As the container revolves (65 rpm), the samples of material in the test chambers move freely and rub both against the walls and against the rubber rollers. The test period is 8 hours, during which the samples are compared hourly with standard EMPA (Eidgenössische Material-und Prüfanstalt Zürich) photographs and evaluated with figures of merit from 1 to 5. Only pills which remain adhering to the fabric are recorded. The average of the 8 measurements made after each hour is taken as the result. The poorest figure of merit 1 signifies very severe nep formation, and the best figure of merit 5 signifies no nep formation or only slight nep formation. The results of this pilling test are summarised, as figures of merit, in the following Table II:

TABLE II

| | PES/CV 67/33 | | PAC | |
| --- | --- | --- | --- | --- |
| | treated | untreated | treated | untreated |
| Anti-pilling figures of merit | | | | |
| Before 5 domestic washes | 2.8 | 2.3 | 3.3 | 2.6 |
| After 5 domestic washes | 2.5 | 2.1 | 3.3 | 2.4 |

Similar results, i.e. permanent good anti-pilling effects, compared with untreated textile materials, which are also largely retained after several normal washes in the home, are achieved by treating the textile materials with the emulsions of any one of Examples 1 to 7, 9 or 10.

EXAMPLE 13

A polyester woven fabric is padded with an aqueous liquor containing 0.5% of the 30% emulsion obtained in Example 9 and is dried at 80° C. for 30 minutes and subjected to heat treatment at 180° C. for 1 minute by the thermofixing method. The anti-snagging effects of the fabric thus treated, compared with those of untreated fabrics, are tested in a unit called a "Mace-Snag-Tester" from ICI. Details of the test unit and the measurement method are given, for example, in Melliand Textilberichte volume 54, pages 942–945 (9/1973) and in American Dyestuff Reporter volume 61, pages 27–30 (7/1972). The test results are expressed as figures of merit, 5 being the best figure of merit (no snagging) and 1 being the poorest (severe snagging). A figure of merit of 3–4 is regarded as satisfactory for ladies fashions.

The polyester woven fabric treated according to the invention has a figure of merit of 4–5 in the antisnagging test, whilst the untreated fabric receives a figure of merit of 3. Similar results are achieved when the polyester fabric is treated with the emulsions obtained in any of Examples 1 to 8 or 10.

EXAMPLE 14

A polyacrylonitrile knitted fabric is padded with an aqueous liquor containing 1% of the 30% emulsion obtained in Example 2, and is dried and subjected to thermofixation as in Example 11. Samples (10×5 cm) of the knitted fabric thus treated and of the untreated knitted fabric are now placed in a 2 l container and are shaken, in the presence of air-filter dust (20%, relative to the weight of knitted fabric), in a shaking machine from Bachofen, Basel, at 15 rpm for 30 minutes. The loose dust is then shaken off and subsequently vacuumed with a domestic vacuum cleaner. The extent of dry soiling of the test pieces is then evaluated using the BS (British Standard) 2663 (1961) grey scale for assessing staining. The grey scale has ten areas in grey-white shades which are arranged in pairs and have 5 degrees of contrast in geometrical progression. The grey scale can be obtained from WIRA in Leeds (England). If the typical sample (in the present case the untreated, soiled knitted fabric) is allocated the figure of merit 5, test pieces which are more severely soiled than the typical sample are given figures of merit lower than 5, for example 0–1 to 4–5, and the test pieces which are less severely soiled than the typical sample are given figures of merit higher than 5, for example 5–6 to 9–10.

If the untreated and soiled polyacrylonitrile knitted fabric is allocated the figure of merit 5, the polyacrylonitrile knitted fabric according to the invention has a dry soiling figure of merit of 6–7.

Similar results are achieved when the knitted fabric is treated with the emulsions of any of Examples 1 or 3 to 10.

What is claimed is:

1. A mixture of components which contains, as component (A), at least one water-dispersible or water-soluble salt of a reaction product, this salt being prepared by reacting (a) 1.0 epoxy group equivalent of a diglycidyl ether of 2,2-bis-(4'-hydroxyphenyl)-propane, (b) 0.2 to 5.0 amino group equivalents of a polyalkylenepolyaminoamide of (b') a polymerised, unsaturated fatty acid which is derived from fatty acids having 12 to 24 carbon atoms and (b'') an aliphatic polyalkylenepolyamine having 4 to 12 carbon atoms, (c) 0 to 0.6 amino group equivalent of at least one primary fatty amine having 12 to 24 carbon atoms, 1.0 to 5.0 amino group equivalents of component (b) being employed if component (c) is absent, and 0.5 to 2.0 amino group equivalents of component (b) being employed if component (c) is used, and (d) 0 to 0.1 mol of an epihalogenohydrin, in the presence of an inert, organic solvent at temperatures up to 110° C., it being ensured, by adding an acid, at the latest when the reactions have ended, that a sample of the reaction mixture diluted with water to 10 to 40 percent by weight has a pH value of 2 to 8, a salt being formed, and, as component (B), a homopolymer of styrene or a copolymer of styrene or acrylonitrile and an alkyl acrylate or methacrylate having 4 to 12 carbon atoms in the alkyl radical.

2. A mixture according to claim 1 which contains, as component (A), a reaction product salt which is prepared from a diglyicidyl ether of 2,2-bis-(4'-hydroxyphenyl)propane containing 5 to 5.5 epoxy group equivalents per kg, as component (a).

3. A mixture according to claim 1 which contains, as component (A), a reaction product salt which is prepared from a polymerised acid derived from an ethylenically unsaturated fatty acid having 16 to 18 carbon atoms, as component (b').

4. A mixture according to claim 1 which contains, as component (A), a reaction product salt which is prepared from diethylenetriamine, triethylenetetramine or tetraethylenepentamine, as component (b'').

5. A mixture according to claim 1 which contains, as component (A), a reaction product salt which is prepared from a primary fatty amine having 16 to 18 carbon atoms, as component (c).

6. A mixture according to claim 1 which contains, as component (A), a reaction product salt which is prepared from epichlorohydrin, as component (d).

7. A mixture according to claim 1 which contains, as component (A), a reaction product salt which is prepared from component (a) and from a polyalkylenepolyaminoamide containing 3 to 5 amino group equivalents per kg, as component (b).

8. A mixture according to claim 1 which contains, as component (A), a reaction product salt which is prepared from component (a) and from a polyalkylenepolyaminoamide and a fatty amine, as components (b) and (c), each containing 3 to 5 amino group equivalents per kg.

9. A mixture according to claim 1 which contains, as component (A), a reaction product salt which is prepared from components (a), (b) and (d).

10. A mixture according to claim 1 which contains, as component (A), a reaction product salt which is prepared from components (a), (b), (d) and (c).

11. A mixture according to claim 1 which contains, as component (A), a reaction product salt which is prepared from 1.0 epoxy group equivalent of component (a) and 1.5 to 5.0 amino group equivalents of component (b).

12. A mixture according to claim 1 which contains, as component (A), a reaction product salt which is prepared from 1.0 epoxy group equivalent of component (a), 0.5 to 2.0 amino group equivalents of component (b) and 0.2 to 0.5 amino group equivalent of component (c).

13. A mixture according to claim 1 which contains, as component (A), a reaction product salt which is prepared from 0.1 to 0.5 mol of the additional component (d) per epoxy group equivalent of component (a).

14. A mixture according to claim 1 which contains, as component (A), a reaction product salt which is prepared by taking component (b) and then reacting it with component (a).

15. A mixture according to claim 1 which contains, as component (A), a reaction product salt which is prepared by reacting components (a) and (c) and then reacting the product with component (b).

16. A mixture according to claim 1 which contains, as component (A), a reaction product salt which is prepared by taking component (c) and then first reacting it with component (a) and subsequently reacting the product with component (b).

17. A mixture according to claim 1 which contains, as component (A), a reaction product salt which is prepared by final reaction with the additional component (d).

18. A mixture according to claim 1 which contains, as component (A), a reaction product salt which is prepared by adding at least one inorganic or organic acid having at most 4 carbon atoms.

19. A mixture according to claim 1 which contains, as component (A), a reaction product salt which is prepared by adding hydrochloric acid, nitric acid, phosphoric acid or sulfamic acid, a saturated monocarboxylic or dicarboxylic acid having at most 4 carbon atoms or a mixture thereof.

20. A mixture according to claim 1 which contains, as component (A), a reaction product salt which is prepared by adding sulfamic acid by itself, or orthophosphoric acid, with subsequent addition of formic acid or acetic acid.

21. A mixture according to claim 1 which contains, as component (A), a reaction product salt which is prepared by adding oxalic acid, formic acid or acetic acid.

22. A mixture according to claim 1 which contains, as component (A), a reaction product salt which can be diluted with water to form a clear solution.

23. A mixture according to claim 1 which contains, as component (A), a reaction product salt which is prepared by adding acetic acid, a sample of the reaction product salt diluted with water having a pH value from 4 to 6.

24. A mixture according to claim 1 which contains, as component (A), a reaction product salt which can be diluted with water to give a 15 to 35 percent by weight solution.

25. A mixture according to claim 1 which contains, as component (A), a reaction product salt which is prepared in the presence of an inert organic solvent at 60° to 95° C.

26. A mixture according to claim 1 which contains, as component (A), a reaction product salt which is prepared in the presence of a cycloaliphatic or aliphatic ether having 2 oxygen atoms and 4 to 8 carbon atoms, as the solvent.

27. A mixture according to claim 1 which contains, as component (A), a reaction product salt which is prepared in the presence of an alkanol having 1 to 4 carbon atoms, as the solvent.

28. A mixture according to claim 1 which contains, as component (B), a homopolymer or copolymer which is prepared in the presence of water, component (A) and a polymerisation catalyst at temperatures of up to 95° C.

29. A mixture according to claim 1 which contains, as component (B), a homopolymer or copolymer which is prepared in the presence of a peroxide, as the polymerisation catalyst.

30. A mixture according to claim 1 which contains, as component (B), a copolymer which is obtained from styrene or acrylonitrile and an alkyl acrylate or methacrylate having 4 to 12 carbon atoms in the alkyl radical and which has a weight ratio of styrene or acrylonitrile:alkyl ester of the type mentioned of 1:0.1 to 1:2.0.

31. A mixture according to claim 1 which contains, as component (B), a copolymer which is obtained from acrylonitrile and an alkyl acrylate or methacrylate having 4 to 12 carbon atoms in the alkyl radical and which has a weight ratio of acrylonitrile:alkyl ester of 1:1.2 to 1:1.8.

32. A mixture according to claim 1 which contains, as component (B) a copolymer which is obtained from styrene and an alkyl acrylate or methacrylate having 4 to 12 carbon atoms in the alkyl radical and which has a weight ratio of styrene:alkyl ester of 1:0.2 to 1:1.

33. A mixture according to claim 1 which contains, as component (B), a copolymer of styrene or acrylonitrile and an alkyl acrylate with a branched alkyl radical having 4 to 8 carbon atoms.

34. A mixture according to claim 1 which contains 25 to 80 percent by weight of component (A) and 20 to 75 percent by weight of component (B), the sum of components (A) and (B) being 100 percent by weight.

35. A mixture according to claim 1 which is in the form of a 10 to 40 percent by weight mobile, fine emulsion which is stable on storage.

36. A process for the preparation of the mixture of components according to claim 1, which comprises reacting, as component (a), 1.0 epoxy group equivalent of a diglycidyl ether of 2,2-bis-(4'-hydroxyphenyl)-propane, and, as component (b) 0.2 to 5.0 amino group equivalents of a polyalkylenepolyaminoamide of (b') a polymerised, unsaturated fatty acid which is derived from fatty acids having 12 to 24 carbon atoms and (b") an aliphatic polyalkylenepolyamine having 4 to 12 carbon atoms, and, as component (c), 0 to 0.6 amino group equivalent of at least one primary fatty amine having 12 to 24 carbon atoms, 1.0 to 5.0 amino group equivalents of component (b) being employed if component (c) is absent, and 0.5 to 2.0 amino group equivalents of component (b) being employed if component (c) is used, and, as component (d), 0 to 1.0 mol of an epihalogenohydrin in any order in the presence of an inert organic solvent at temperatures of up to 110° C. to give component (A), it being ensured, by adding an acid, at the latest when the reactions have ended, that a sample of the reaction mixture diluted with water to 10 to 40 percent by weight has a pH value of 2 to 8, and diluting the reaction mixture with water and polymerising styrene or a mixture of an alkyl acrylate or methacrylate having 4 to 12 carbon atoms in the alkyl radical and styrene or acrylonitrile in the dilute mixture in the presence of a polymerisation catalyst at the given temperature to give component (B).

37. A process for surface sizing paper, which comprises impregnating the paper to be sized with an aqueous sizing liquor which has a solids content of 0.02 to 1.0 percent by weight of the mixture of components according to claim 1, and then drying the paper.

38. A process for surface sizing paper, according to claim 37, which comprises padding the paper with an aqueous sizing liquor with a solids content of 0.02 to 0.2 percent by weight, and drying the paper at 60° to 140° C.

39. A process for the treatment of a textile material containing synthetic fibres in order to achieve anti-pilling, anti-snagging and soil-repellency effects, which comprises applying the mixtures of components according to claim 1 to the textile material and then drying the textile material and subjecting it to heat treatment.

40. A process according to claim 39, which comprises padding the textile material with an aqueous liquor which contains 1 to 5 percent by weight of the mixture of components, present as a 10 to 40 percent by weight emulsion.

41. A process according to claim 39, which comprises drying the textile material at 70° to 90° C. and subjecting it to heat treatment at 130° to 190° C.

42. A process according to claim 39, which comprises using a woven fabric or knitted fabric of polyacrylonitrile, polyester or polyester mixed with viscose as the textile material.

* * * * *